THERMOPLASTIC MEMORY

Filed May 1, 1963 2 Sheets-Sheet 1

INVENTORS
HAROLD FLEISHER
THOMAS J. HARRIS
EUGENE SHAPIRO

BY George O. Saile
ATTORNEY

United States Patent Office 3,262,122
Patented July 19, 1966

3,262,122

THERMOPLASTIC MEMORY

Harold Fleisher, Thomas J. Harris, and Eugene Shapiro, Poughkeepsie, N.Y., assignors to International Business Machines Corporation, New York, N.Y., a corporation of New York Filed May 1, 1963, Ser. No. 277,233
15 Claims. (Cl. 346—1)

The present invention relates to a recording technique for rapid writing and erasing of digital information on a thermoplastic medium and, more particularly, to a method and apparatus for recording information in the form of depressed discrete areas in a thermoplastic medium by use of a high intensity source of electromagnetic energy and, in particular, light.

The recording of information in the form of a deformation in the surface of a low heat softening thermoplastic film is known to the prior art. A first technique which has been used is to lay down a charge pattern on the surface of a thermoplastic film in accordance with the information to be stored. This is accomplished, for example, by means of an electron beam. The film is then heated to the melting point of the thermoplastic. Electrostatic forces between the charges on the film and the ground plane depress the surface where the charges occur until the forces are in equilibrium. The film is then cooled below the melting point of the thermoplastic and the deformations are fixed within the surface. A second technique for recording information in a thermoplastic film is disclosed in prior Patent Number 3,055,006 issued September 18, 1962, to A. W. Dreyfoos, Jr., R. B. Mazza, W. A. Radke and A. A. Staley entitled, "High Density, Erasable Optical Image Recorder," and assigned to the same assignee as the present invention. The patented technique uses two thin layers, the first of which is composed of a transparent, dielectric material of substantially uniform thickness while the second layer is a thin photoconductive material also functioning as a dielectric. The first layer which is preferably a transparent thermoplastic has applied to it a uniform charge pattern. A modulated light beam is directed onto discrete areas of the thermoplastic surface and the light passes through the transparent layer and lowers the resistance of the photoconductive layer to substantially zero. The charge in these lighted areas is thereby drained off. The charge in the unlighted areas shows no change in its charge pattern. The sandwich element is then heated to the melting point of the thermoplastic material and the deformation pattern is formed corresponding to those areas of higher electrostatic force. Upon cooling, the deformed areas in the thermoplastic layer become rigid.

Each of these prior art techniques requires a special procedure for laying down an electrostatic charge in the areas wherein information is to be recorded followed by a heating step above the melting point of the thermoplastic. Care must be taken of the surface to keep the electrostatic charge in the areas wherein information is to be recorded while the thermoplastic medium is moved from the charge application station to the heating station where the charge pattern is developed. The leakage of the charge to other areas or off the thermoplastic entirely would obviously cause loss of information.

It is an object of the present invention to provide a technique for recording information on a thermoplastic medium in the form of depressed discrete areas in a faster and a more simplified manner.

It is another object of the present invention to provide a method and apparatus for recording information in a thermoplastic medium in the form of depressed discrete areas wherein the discrete areas are recorded on the medium without the special preparation of a charge pattern.

These and other objects are accomplished according to the broad aspects of the present invention by providing a relatively low melting medium on a high melting point substrate. The thermoplastic medium can be in the form of a disc, tape or the surface of a drum. The surface of the thermoplastic film must be uniformly capable of contracting to form a depression therein when it is locally heated in a discrete area to the melting point of the thermoplastic. A monochromatic high intensity continuous wave laser light beam is concentrated onto the selected discrete area of the thermoplastic surface to cause localized melting of the thermoplastic surface. The contracting forces that exist on the thermoplastic surface depress the surface in the melted area until the contracting forces are in equilibrium with the surface tension restoring forces. A depressed area is thereby formed at this localized melted area. The medium is cooled below the melting point of the thermoplastic and the depressed area is fixed in the surface. The light beam is concentrated only in selected areas of the thermoplastic surface under control of the information source. The concentration of the high intensity laser light beam onto a thermoplastic surface can be accomplished at extremely high speeds.

The thermoplastic recording system is flexible in its erasure ability. The thermoplastic recorded medium can be readily entirely erased by heating the thermoplastic medium uniformly above its melting point. Alternately, when it is desired to retain a portion of the recorded information only selected information need be erased. Selective erasure is accomplished by removing the contracting force and melting the thermoplastic in the selected depressed discrete area to be erased by a high intensity light source. The surface tension of the thermoplastic will then smooth out the depressed area. After cooling, the erased area can be again be recorded upon.

The foregoing and other objects, features and advantages of the invention will be apparent from the following more particular description of the preferred embodiments of the invention as illustrated in the accompanying drawings:

Figures 1, 2:
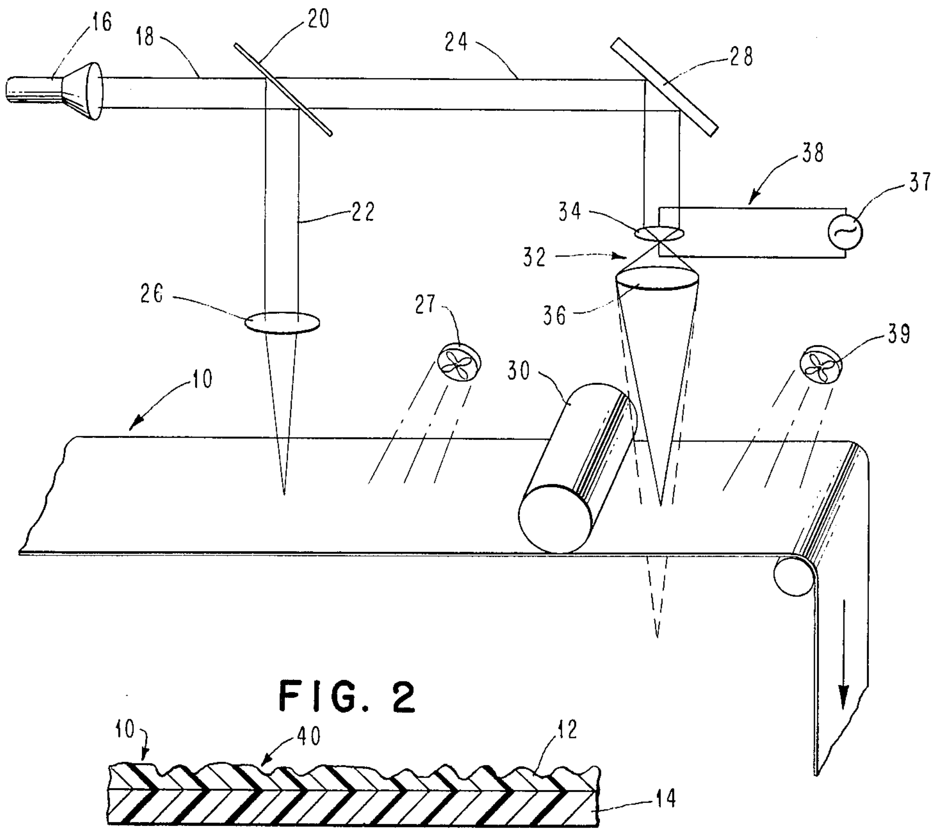
FIGURE 1 is a schematic illustration of a first possible embodiment of the present invention.
FIGURE 2 is a schematic illustration of a thermoplastic storage element having information recorded thereon in the form of depressed discrete areas.

Referring now, more particularly, to FIGURES 1 and 2 there is shown a thermoplastic medium in the form of a tape 10 which is provided for recording information. The thermoplastic medium in this first possible embodiment is composed of a thermoplastic recording layer 12 having a relatively low melting point and a backing layer 14. The backing layer 14 can be any material having a substantially higher melting point than the recording layer. The backing layer maintains the original form of the recording element throughout the recording period. A continuous wave or pulsed laser light beam source 16 provides a high intensity monochromatic light beam. Its beam 18 is projected upon beam splitter 20 which may be in the form of a half-silvered mirror. The beam 18 is therein split into a first and a second light beam 22 and 24. The first light beam 22 is focused upon the recording medium 10 by means of fixed focus lens 26. The light beam is absorbed by the thermoplastic recording layer which is, in turn, almost instantaneously softened above the melting point of the layer to a point where the surface tension of the thermoplastic will smooth out any depressed areas. After cooling the thermoplastic below its melting point by means of a cooling device, such as fan 27, the film is ready for reuse. The second light beam 24 is projected upon a reflecting surface 28. The light beam 24 is reflected from the reflecting surface 28 into the means 32 for controlling and concentrating the light beam onto the surface of the thermoplastic recording medium.

The smooth thermoplastic recording medium moves under means 30 for applying a uniform electrostatic charge to the entire surface of the thermoplastic medium 10. The charge may be applied by conventional means, such as a Corona discharge device.

The second light beam 24 is reflected off mirror 28 onto a means 32 for selectively concentrating the light beam from the light source 16 onto a discrete area of the recording surface 12 of the thermoplastic medium 10. The illustrated concentrating means in this embodiment is a combination of a variable focus lens 34 and a fixed focus lens 36. The variable focus lens 34 either focuses the high intensity light beam onto the thermoplastic medium 10 or defocuses the light beam. A means 38, which is responsive to a source 37 of information in the form of electrical signals, controls the variable focus lens as to whether the light beam is focused or defocused into the thermoplastic medium. When the second light beam 24 is defocused onto the thermoplastic medium, the thermoplastic will not absorb enough light to be heated sufficiently to cause localized melting. However, when the light beam is focused onto a discrete area of the thermoplastic film, the light absorption at that point will be sufficient to cause the near instantaneous localized melting of the thermoplastic medium. The electrostatic forces uniformly laid onto the thermoplastic medium then come into effect in the localized melted area to contract the surface. The electrostatic forces in combination with the surface tension of the thermoplastic medium depress the surface of the medium where the localized melting occurs until these contracting forces are in equilibrium with the surface tension restoring forces. The melted area is cooled below the melting point of the thermoplastic by any conventional means, such as by air circulation which is generally shown as fan 39. A discrete depressed area such as at 40 in FIGURE 2 is thereby formed at the location selected by the information source means 37.

Figure 3:
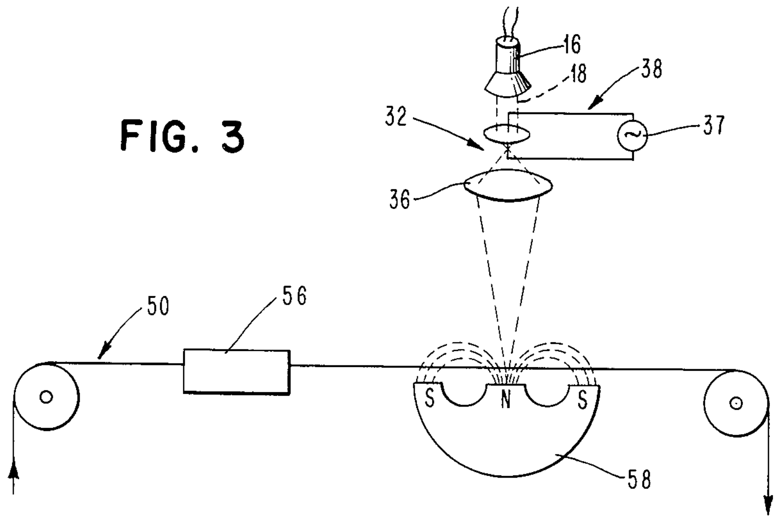
FIGURE 3 is a schematic illustration of a second possible embodiment of the present invention.
Figure 4:
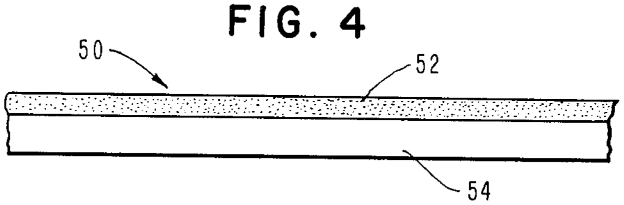
FIGURE 4 is a schematic illustration of the structure of a possible thermoplastic storage element usable in the FIGURE 3 embodiment of the invention.

A second embodiment of the invention is shown in FIGURES 3 and 4 where like numbers in the drawings indicate identical structures throughout the embodiments of the invention. The recording element 50 includes a recording layer 52 which is composed of a uniform dispersion of particles of ferromagnetic material in a low melting point thermoplastic material. A backing member 54 of any high melting material is used to support the recording surface. In this embodiment erasure of the discrete depressions in the film 50 is illustrated as accomplished by means of heater 56. The thermoplastic recording medium is uniformly raised to a temperature above its melting point and the surface tension of the medium will then smooth out these depressions. The thermoplastic medium is cooled by air flowing over its surface and it passes to the recording station of the present embodiment. A means for applying a magnetic field (not shown) may have to be used in conjunction with the erasure heater means to redistribute the magnetic particles within the thermoplastic material.

A high intensity continuous wave or pulsed laser light beam source 16 provides the laser beam 18 to the means 32 for selectively concentrating the light beam from the light source onto a discrete area of the thermoplastic medium 52. In a manner described in the FIGURE 1 and FIGURE 2 embodiment the light beam will either be focused or defocused upon the desired discrete area of the thermoplastic medium 50. Upon melting a selected discrete area of the thermoplastic recording surface 52, the magnet 58 distorts the discrete area by magnetic attraction of the embedded ferromagnetic particles in the recording surface 52. Contracting of the recording surface to form depressed areas is thereby accomplished. The surface is then cooled and the distorted or depressed discrete area is fixed in the thermoplastic recording surface.

Figure 6:
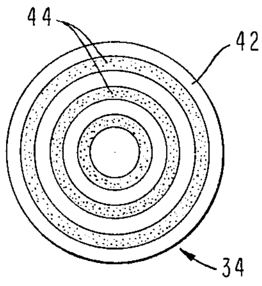
FIGURE 6 is the variable focus lens of FIGURE 5 viewed from the position of the light source.
Figure 5:
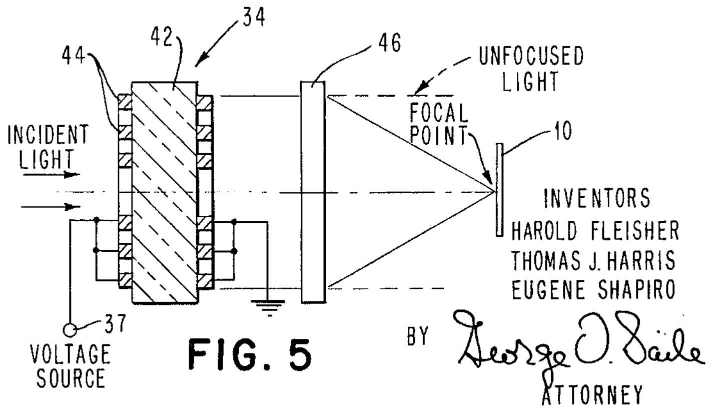
FIGURE 5 is a greatly enlarged, sectional illustration of one form of a variable focus lens which may be used in the embodiments of FIGURES 1 and 3.

The variable focus lens 34 of the FIGURES 1 and 3 embodiments might take the form shown in FIGURES 5 and 6. This variable focus ens device is the subject of patent application Serial No. 286,087, filed June 6, 1963, by Harold Fleisher and assigned to the same assignee as the present invention. The variable lens 34 is constructed of a single crystal 42 of optically transparent material in the frequency range of the light emitted by the laser 16. Examples of materials suitable for this purpose are potassium dihydrogen phosphate, ammonium dihydrogen phosphate and barium titanate. A plurality of concentric annular transparent electrodes 44 are applied to two opposite sides of the crystal. All electrodes on each side are electrically tied together to thus form a set of parallel condensers in concentric ring configuration. A light polarizing sheet 46 is spaced from the crystal 42 and transparent electrode structure 44 on the side opposite to the light source 16. The light applied to the input surface of the variable lens 34 must be circularly polarized monochromatic collimated light. If the laser source 16 is not in itself a circularly polarized light source, a conventional circular light polarizer sheet is placed in the path of the light source to circularly polarize the monochromatic collimated light from the laser 16. The ring spacing is dependent upon the incident light's wavelength and the distance from the focal point to the light polarizing sheet 46.

In the case where no voltage is applied to the electrodes 44, the circularly polarized light will pass through the crystal 42 and light polarizing sheet 46 with minimal effect and no appreciable focusing at the focal point. However, with an application of a voltage from the information source means 37 through the controlling means 38, the material between the conductive transparent electrodes becomes birefringent. These regions function as quarter-wave plates for the incident wavelength. The light emerging from these areas is linearly polarized. The circularly polarized light passes through the rest of the crystal unchanged. Thus, the collimated light now incident on the light-polarizing sheet 46 consists of alternate annuli of circuitry and linearly polarized light. The light polarizing sheet 46 passes only the circularly polarized light. The extinction of the linearly polarized light produces the proper condition for Fresnel zone plate action, and the result is a focusing of the circularly polarized light at the focal point.

While a variable focus lens 34 of the type described is the preferred means for concentrating the light on discrete areas of the thermoplastic surface because of its high speed characteristics, it is clear that various mechanical and electro-optic light valves of the prior art also could be used. These light valves would be placed in the path of the high intensity light beam and focused by a fixed focused lens onto the thermoplastic recording surface. The light valve could then be controlled by electrical means to allow the passage of light only when a recording was desired. These light valves, of course, would have to be constructed of materials that would not absorb energy from high intensity laser beam.

Figures 7, 8, 9:
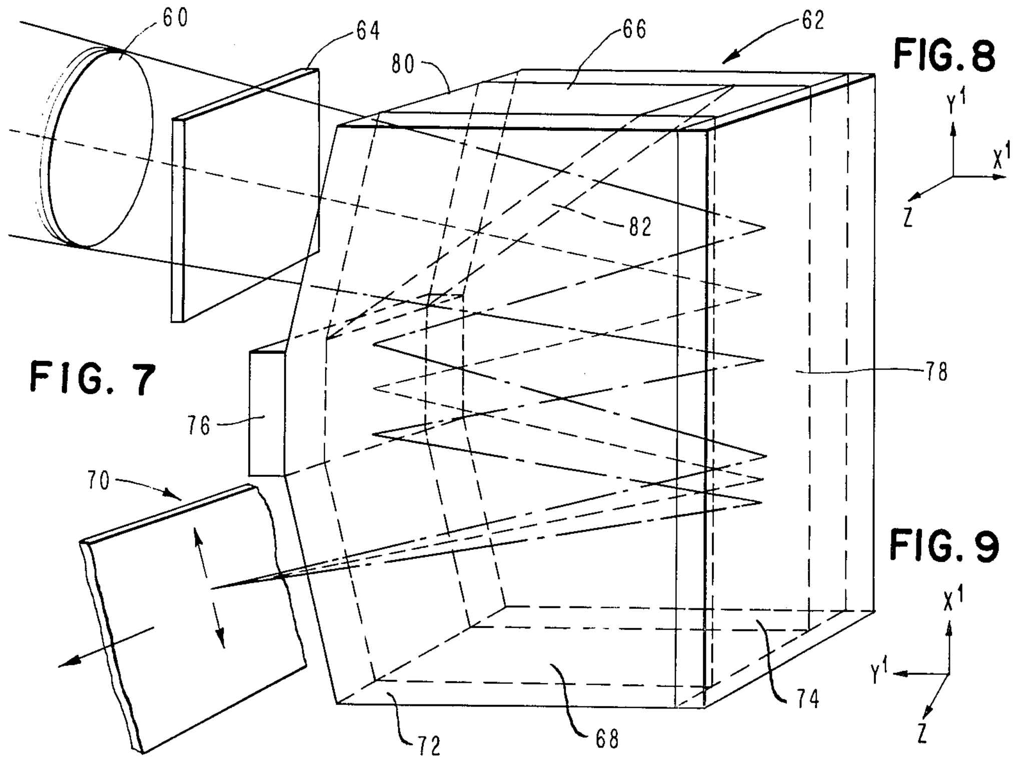
FIGURE 7 is a diagrammatic illustration of a light deflection device which may be used in conjunction with the present invention.
FIGURE 8 shows the main axes of the electrically deformed index ellipsoid of the first electro-optic medium in the FIGURE 7 device.
FIGURE 9 shows the main axes of the electrically deformed index ellipsoid of the second electro-optic medium of the FIGURE 7 device.

FIGURE 7 illustrates one possible means for deflecting the high intensity laser beam across the thermoplastic recording medium by high speed electro-optic techniques so that information can conveniently be recorded in another dimension on the medium. This light deflection device is shown in detail in patent application Serial No. 281,622, filed May 20, 1963, by H. Fleisher, T. J. Harris, and E. Shapiro and assigned to the same assignee as the present invention. The laser beam, which must be monochromatic and substantially collimated, is applied to fixed focus lens 60 which is designed to focus the laser beam through the deflection device 62 onto the surface of the recording medium 70. The deflection device is shown greatly enlarged in proportion to other elements of the drawings as an aid to understanding the operation of the device. The means 64 is controlled to allow or disallow the light beam to be projected in its concentrated form onto localized areas of the thermoplastic medium 70. Means 64 could be the variable focus lens as described above in the earlier embodiments or some form of a mechanical or electro-optic light shutter, as is known in the art.

The deflection device means 62 as illustrated is composed of two electro-optic crystals 66 and 68 which may be, for example, barium titanate, having contiguous faces on the diagonal plane 82, FIG. 7. The crystals are optically oriented 90° from one another, as indicated by the axis diagrams. FIGURES 8 and 9, in such a manner that when an electric field is applied along the Z axis of the crystals the indices of refraction of the crystals change in opposite directions. Conductive electrodes 72 and 74 are applied to opposite surfaces of the crystal. Reflective surfaces 76 and 78 are applied to other opposite surfaces of the crystal. The light input for illustrative purposes is polarized in the $y'$ direction and is monochromatic. The light enters the input surface 80 of the electro-optic and passes through the first crystal 66 until refracted at the boundary 82 between the two crystals. By proper voltage application to the electrodes 72 and 74 the output light beam can be deflected through a broad area. The path length is also substantially lengthened by the internal reflection means 76 and 78.

The method for operating the system for recording digital information on a thermoplastic medium begins by providing a continuous wave or pulsed laser monochromatic light beam. The thermoplastic medium to be recorded upon must be provided with a surface uniformly capable of contracting to form a depression in the surface when it is locally heated in a discrete area to the melting point of the thermoplastic.

The two systems disclosed for providing such a characteristic in a thermoplastic are disclosed in the first and second embodiments of the present invention. The first embodiment utilizes the application of a uniform electrostatic charge to the entire surface of the thermoplastic medium. The second embodiment incorporates magnetic particles within the thermoplastic medium recording surface and utilizes a magnetic force to attract these particles for its surface contracting characteristic.

The highly directed laser light beam is applied onto a selected discrete area of the thermoplastic surface at the response of an information source to cause localized melting of the surface. The localized melting of an electrostatically charged surface causes the contraction of the thermoplastic surface in the form of a depression until the electrostatic forces are in equilibrium with the surface tension restoring forces. In the case of the second disclosed embodiment of contracting force, the concentrated light beam is applied to a selected area of the thermoplastic medium causing melting therein. A strong magnetic force is applied to the thermoplastic medium which attracts the magnetic particles uniformly dispersed throughout the recording surface of the thermoplastic medium to form a depression in the thermoplastic medium surface. In each case, the thermoplastic material is then cooled with the resultant fixing of the depressed area in the thermoplastic medium.

The selected erasure and recording in the areas erased within an already generally recorded thermoplastic medium are possible. The location of discrete areas to be erased and a second recording made thereon can readily be located on the recording surface by use of suitable synchronizing marks, holes or other indicia on the medium as is well known to the prior art. The controlled erasure means can take the identical form of the selected light concentrating means 32. The erasure light concentrating means and the recording light concentrating means are synchronized by means of a central information control to produce the desired erasure and recording results.

Read out of the formed discrete depressions as bits of information, which is not a part of the present invention, can readily be done with prior art procedures. One such system is to use the thermoplastic surface as a diffraction grating which in conjunction with a beam of light produces a light diffraction pattern corresponding to the surface depressed area characteristic. The characteristic light diffraction patterns may then be converted in any suitable fashion to electrical outputs representative of the stored information.

The thermoplastic medium can be in the form of, for example, a disc, tape or the surface of a drum. The thermoplastic recording layer is composed of a thin coating of a material having relatively low melting point in the range of preferably 100–150° C. Thermoplastic materials such as polyethylene and polystyrene may be used as the recording surfaces themselves or may be blended with other materials to provide an optimum recording surface. The addition of certain dyes to the thermoplastic layer, for example, could be used to enhance the heat absorption of the thermoplastic layer. The particular dye used would depend upon the particular monochromatic light source. In almost all cases the reduction in the transparency of the film to the given light increases the absorption of light by the layer and the resultant heat generation.

The backing or base layer for the thermoplastic recording layer can be composed of any high melting material which would be unaffected by the heat from the laser light source and which would adhere well to the thermoplastic recording layer. The backing layer would preferably be metallic where the thermoplastic medium is in the form of a disc or the surface of a drum because of the particular support strength requirements. Alternately, where the thermoplastic medium is in the form of a tape, either continuous or in a loop shape, the backing or base layer is preferably a thermoplastic material which has high melting point characteristics, such as polyethylene terephthalate.

The second disclosed embodiment requires the uniform incorporation of ferromagnetic particles into the thermoplastic recording surface. In this embodiment, the thermoplastic materials used in the recording surface would be substantially identical to the first recording layer. The change would solely be in the addition of fine ferromagnetic particles to the thermoplastic material.

The recording layer can readily be applied by standard coating techniques to the backing layer form desired. One procedure would be to make a solution of the thermoplastic to be applied in a suitable solvent, apply a thin coating of the liquid mass to the surface of the backing layer by means of a gravure roller or doctor blade, and evaporate the solvent from the coated material. Where the ferromagnetic particles are to be dispersed in a thermoplastic recording surface, the ferromagnetic particles are suspended in the coating material by agitation during the coating period. Less solvent would be used in this case to prevent the settling of the particles to the bottom of the recording layer prior to the evaporation of the solvent.

The invention is not limited to a particular laser source. There is an ever increasing number of continuously operating lasers on the market. Examples of continuously operating lasers are in the solid state, calcium fluoride doped with dysprosium, calcium tungstate doped with trivalent neodymium and ruby crystals; the gaseous types utilizing gases such as helium, neon, argon, crypton and zenon; and the semiconductor lasers as the gallium arsenide diode. The choice of the particular continuous wave (CW) laser depends largely upon the frequency or color of the light desired and energy content of the beam required. The calcium fluoride crystal doped with divalent dysprosium is a good light source since its output is greater than 0.3 watt. An even more suitable coherent, collimated light source is the gallium arsenide diode because of its excellent efficiency and output energy available. The particular details of the laser light source structures and particular pumping or power sources are not given since these light sources are known in the art and discussion in detail would needlessly add to the description of the present invention.

While this invention has been particularly shown and is described with reference to preferred embodiments thereof, it will be understood by those skilled in the art that the foregoing and other changes in form and details may be made therein without departing from the spirit and scope of the invention.

What is claimed is:

1. A method for recording information in a thermoplastic medium in the form of depressed discrete areas therein comprising:
- providing a continuous wave laser light beam;
- providing a thermoplastic medium having a surface uniformly capable of contracting to form a depression in the surface when it is locally heated in a discrete area to the melting point of the thermoplastic;
- applying said beam onto said surface of the thermoplastic medium through a variable focus lens; and
- varying the said variable focus lens by a high voltage in formation source whereby the beam is directed to said thermoplastic surface in focus causing melting and contracting of the said medium at that point or in defocus which causes no physical change in said medium.

2. A method for recording information in a thermoplastic medium in the form of depressed discrete areas therein comprising:
- providing a continuous wave laser light beam;
- providing a thermoplastic medium having a surface uniformly capable of contracting to form a depression in the surface when it is locally heated in a discrete area to the melting point of the thermoplastic;
- applying said light beam onto said surface of the medium through a variable focus lens;
- varying the said variable focus lens between the focusing of the said light beam onto the surface and the defocusing of the said light beam onto said surface whereby a depression is effected in said surface only when said light beam is focused onto said surface;
- and cooling said thermoplastic medium to fix said depression therein.

3. A method for recording information in a thermoplastic medium in the form of depressed discrete areas therein comprising:
- providing a continuous wave laser light beam;
- providing a thermoplastic medium having a surface uniformly capable of contracting to form a depression in the surface when it is locally heated in a discrete area to the melting point of the thermoplastic;
- spliting said beam into first and second beams;
- focusing said first beam onto said medium to erase previously written information therefrom;
- cooling said medium after said erasing;
- applying said second beam onto said surface of the medium through a variable focus lens;
- varying the said variable focus lens by a high voltage information source whereby the second beam is directed to said surface in focus causing deformation in the medium at that point or in defocus which causes no physical change in said medium;
- and cooling said thermoplastic medium to fix said depression.

4. A method for recording information in a thermoplastic medium in the form of depressed discrete areas therein comprising:
- providing a continuous wave laser light beam;
- providing a thermoplastic medium having a surface uniformly capable of contracting to form a depression in the surface when it is locally heated in a discrete area to the melting point of the thermoplastic;
- splitting said beam into first and second light beams;
- focusing said first beam onto said medium to erase previously written information therefrom;
- cooling said material after said erasing;
- applying said second beam onto said surface of the medium through a variable focus lens; and
- varying the said variable focus lens between the focusing of the said second light beam onto said surface and the defocusing of the said second light beam onto said surface whereby a depression is effected in said surface only when said second light beam is focused onto said surface.

5. A method for recording information in a thermoplastic medium in the form of depressed discrete areas therein comprising:
- providing a continuous wave laser light beam;
- providing a thermoplastic medium having a surface uniformly capable of contracting to form a depression in the surface when it is locally heated in a discrete area to the melting point of the thermoplastic;
- applying a uniform electrostatic charge to the entire said surface of the thermoplastic medium; and
- concentrating said light beam onto a selected discrete area of said surface at the response of an information source to cause localized melting of said thermoplastic surface and a resulting depressed area.

6. The method defined in claim 5 wherein said light concentrating step is accomplished by varying the application of said light beam between focusing the said light beam onto said surface and defocusing the said light beam onto said surface whereby a depression is effected in said surface only when said light beam is focused onto said surface.

7. The method defined in claim 5 wherein said light concentrating step is accomplished by varying the application of said light beam between the focusing of the light beam onto said surface and shutting off said light beam from said surface whereby a depression is effected in said surface only when said light beam is focused on said surface.

8. An apparatus for recording information in a thermoplastic medium in the form of depressed discrete areas therein comprising:
- a continuous wave laser light beam source;
- means for selectively concentrating the light beam from said light source onto a discrete area of the surface of said thermoplastic medium to cause localized melting of the surface of said medium and a resulting depressed area;
- and means for controlling said means for concentrating the light beam.

9. An apparatus for recording information in a thermoplastic medium in the form of depressed discrete areas therein comprising:
- a continuous wave laser light beam source;
- a source of information in the form of electrical signals;

means for selectively concentrating the light beam from said light source onto a discrete area of the surface of said thermoplastic medium to cause localized melting of the surface of said medium and the resulting depressed area;

and means responsive to said source of information for controlling said means for concentrating the light beam;

said means for concentrating the said light beam including a fixed focused lens in combination with a light shutter which is opened and closed in accordance with the said source of information.

10. An apparatus for recording information in a thermoplastic medium in the form of depressed discrete areas therein comprising:

a continuous wave laser light beam source;

a source of information in the form of electrical signals;

means for selectively concentrating the light beam from said light source onto a discrete area of the surface of said thermoplastic medium to cause localized melting of the surface of said medium and a resulting depressed area;

and means responsive to said source of information for controlling said means for concentrating the light beam;

said means for concentrating the said light beam including a variable focus lens which focuses and defocuses the said light beam onto said medium in accordance with the said source of information.

11. An apparatus for recording information in a thermoplastic medium in the form of depressed discrete areas therein comprising:

a continuous wave laser light beam source;

means for splitting said light beam into first and second light beams;

means for focusing said first light beam onto said material to erase previously written information therefrom;

means for cooling said medium;

a source of information in the form of electrical signals;

means for selectively concentrating the said second light beam onto a discrete area of the surface of said thermoplastic medium to cause localized melting of said medium and a resulting depressed area;

means responsive to said source of information for controlling said means for concentrating the said second light beam;

and means for cooling said medium to fix said depression thereon.

12. An apparatus for recording information in a thermoplastic medium in the form of depressed discrete areas therein comprising:

a continuous wave laser light beam source;

means for splitting said light beam into first and second light beams;

means for focusing said light beam onto said material to erase previously written information therefrom;

means for cooling said medium;

means for applying a uniform electrostatic charge to the entire surface of said medium;

a source of information in the form of electrical signals;

means for selectively concentrating the said second light beam onto a discrete area of the surface of said thermoplastic medium to cause localized melting of said medium and a resulting depressed area;

means responsive to said source of information for controlling said means for concentrating the said second light beams;

and means for cooling said medium to fix said depression thereon.

13. The apparatus defined in claim 12 wherein the said means for concentrating the second light beam includes a fixed focused lens in combination with a light shutter which is opened and closed in accordance with the said source of information.

14. The apparatus defined in claim 12 wherein the said means for concentrating the second light beam includes a variable focused lens which focuses and defocuses the said second light beam onto said medium in accordance with said source of information.

15. Apparatus for selectively producing surface deformations in a thermoplastic medium to record data therein, comprising:

a light source including a laser for supplying a high-intensity light beam;

surface preconditioning means for applying an electrostatic charge uniformly to a large surface area of the thermoplastic medium;

an information signal source; and selective light directing means controlled by said information signal source for applying a concentrated light beam from said light source to a selected discrete portion of said charged surface area in response to a signal from said information signal source, thereby to cause localized melting of the thermoplastic medium and resultant deformation of its surface due to electrostatic attraction at the position on said surface which is addressed by the beam.

References Cited by the Examiner

UNITED STATES PATENTS

| | | | |
|---|---|---|---|
| 2,616,961 | 11/1952 | Groak | 340—173 |
| 3,120,991 | 8/1958 | Newberry et al. | 178—6.6 |

BERNARD KONICK, *Primary Examiner.*

K. CLAFFY, IRVING L. SRAGOW, *Examiners.*

M. S. GITTES, *Assistant Examiner.*